Nov. 11, 1924.  1,515,300
J. FERRIS
POWER TRANSMISSION
Filed Oct. 4, 1922    3 Sheets-Sheet 1

Inventor:
John Ferris
by Wm O Belt atty.

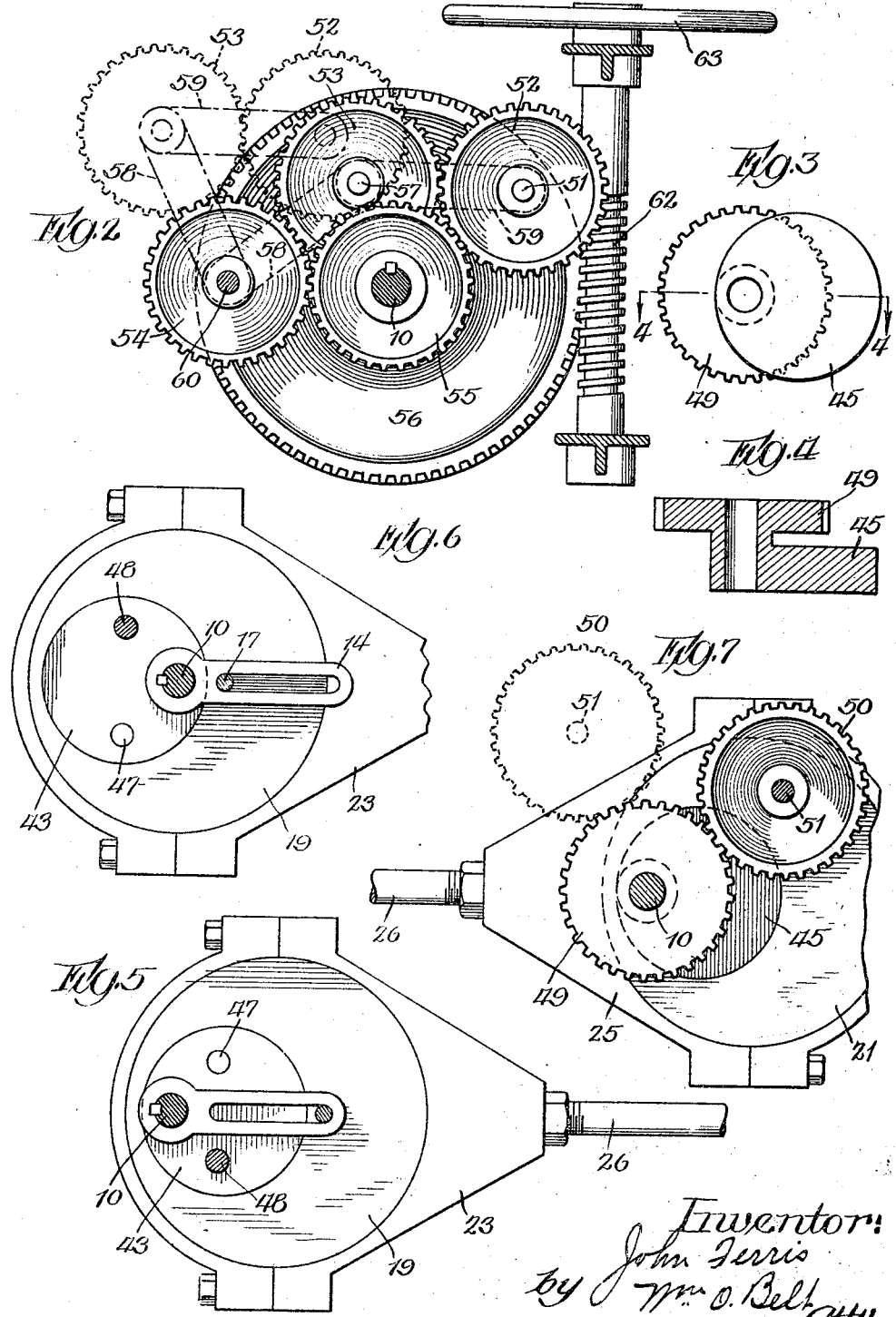

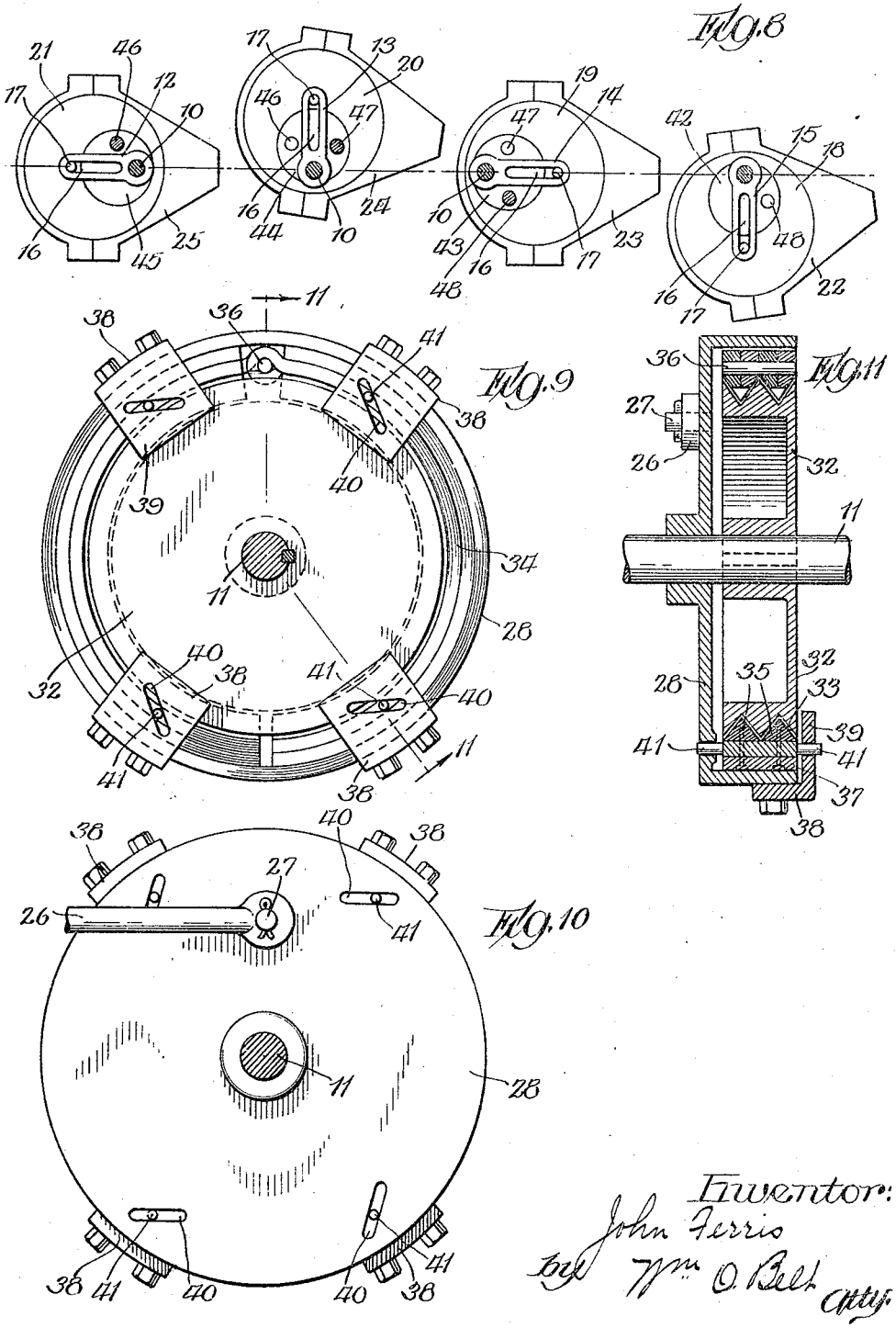

Patented Nov. 11, 1924.

1,515,300

UNITED STATES PATENT OFFICE.

JOHN FERRIS, OF CHICAGO, ILLINOIS.

POWER TRANSMISSION.

Application filed October 4, 1922. Serial No. 592,192.

*To all whom it may concern:*

Be it known that I, JOHN FERRIS, a citizen of the United States, residing at Chicago, in the county of Cook and State of Illinois, have invented certain new and useful Improvements in Power Transmissions, of which the following is a specification.

This invention relates to the transmission of power and has for its principal object to permit a motor or other prime mover to drive mechanism or the like at any desired ratio between certain high and low limits.

A further object of the invention is to provide a transmission between driving and driven elements that will permit the ratio to be varied at will without breaking the continuity of the drive.

Further objects of the invention will become apparent as the description is read in connection with the accompanying drawings illustrating a selected embodiment of the invention, and in which Fig. 1 is a plan view of a device made according to the invention.

Fig. 2 is a section taken on the line 2—2 of Fig. 1.

Fig. 3 is a side elevation of an eccentric and its attached gear.

Fig. 4 is a transverse section on the line 4—4 of Fig. 3.

Figs. 5 and 6 are side elevations showing different positions of the eccentrics.

Fig. 7 is a sectional view taken on the line 7—7 of Fig. 1.

Fig. 8 is a view illustrating the relation between the several eccentrics.

Figs. 9 and 10 are side elevations of one of the clutch elements, and

Fig. 11 is a sectional view taken on the line 11—11 of Fig. 9.

Figure 1:
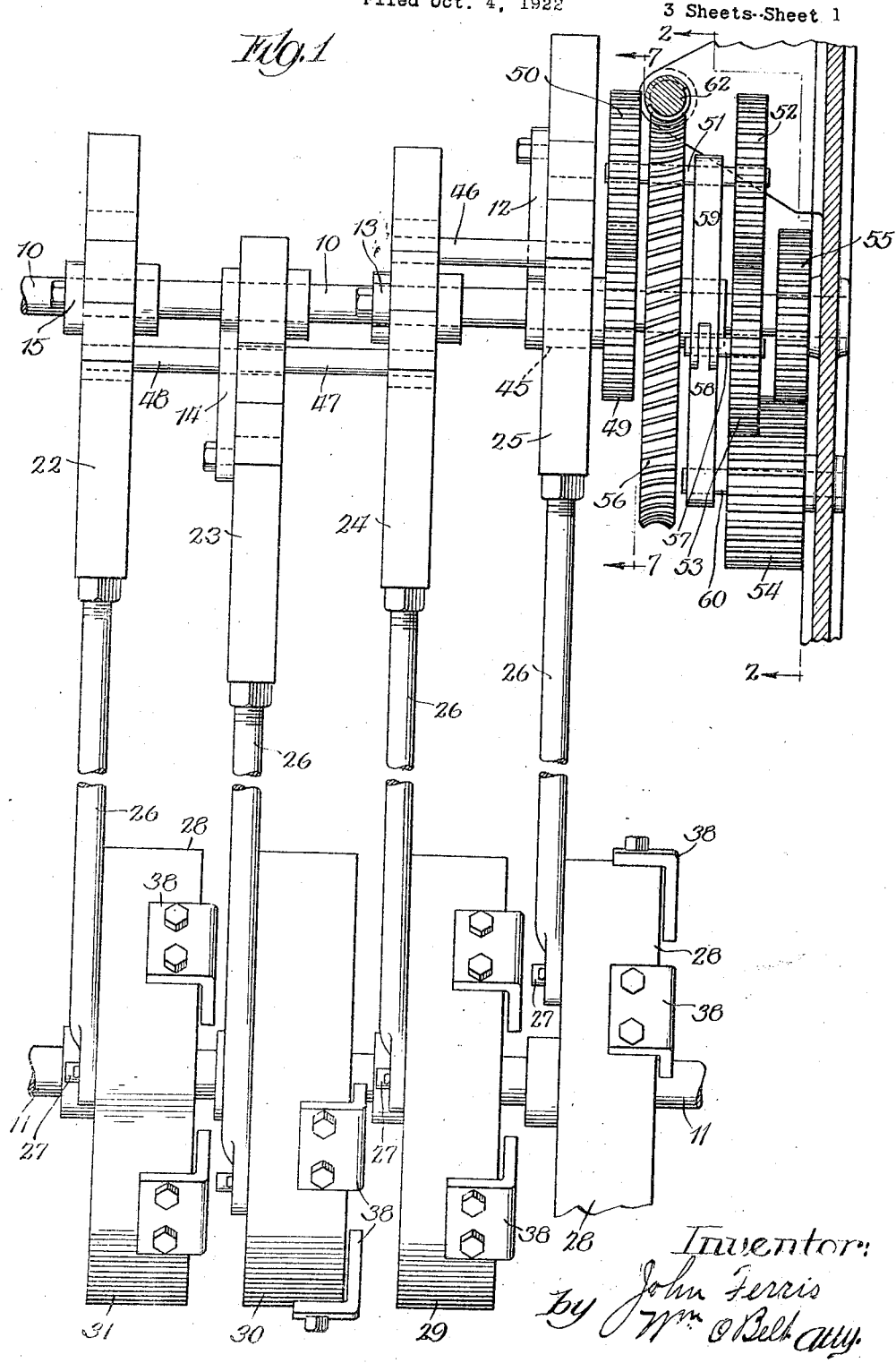

The driving element of any suitable character is here represented by a shaft 10 and the driven element by a shaft 11 (Fig. 1). The shaft 10 is equipped with crank arms 12, 13, 14 and 15, each of which is slotted as indicated at 16 to receive the pin 17 carried by each of four eccentrics 18, 19, 20 and 21. These eccentrics are equipped with straps 22, 23, 24 and 25, each of which has a connecting rod 26 attached to the crank pin 27 of one of four drums 28, 29, 30 and 31, which are journaled on the shaft 11. A pulley 32 is fixed to the shaft 11 within each of these drums and presents a friction surface in the form of a grooved cylinder 33. A friction band 34 lies between each drum and its pulley and carries friction elements 35 adapted to be received in the grooves of the pulleys. The bands are preferably hinged as indicated at 36 to permit them to expand and contract freely. A cushion 37 of felt or other suitable material is secured to the outside of each friction band to prevent noise. Each drum 28, 29, 30 and 31 is equipped with a plurality of brackets 38 having flanges 39 extending substantially parallel to the webs of the drums and lying on the opposite side of the pulleys therefrom. The webs and flanges are equipped with inclined slots 40 adapted to receive pins 41 carried by the friction bands and to thereby force the bands into or out of engagement with the pulleys. When a drum is rotated in counter clockwise direction in Fig. 9, the inclined faces of the slots 40 will cause the pins 41 to force the bands into engagement with the pulleys, but when the drums are rotated in clockwise direction the grooves will force the pins to release the bands.

The eccentrics 18, 19, 20 and 21 are journaled on eccentrics 42, 43, 44 and 45 which are loosely journaled on the shaft 10 and angularly spaced apart thereon. Preferably the throw of the smaller eccentrics is equal to the throw of the larger eccentrics so that by a proper relationship the eccentrics may be made to neutralize, but any other suitable arrangement may be used, as conditions may require. By rotating the eccentrics 42, 43, 44 and 45, the effective throw of each pair of eccentrics can be varied to thereby vary the amount of movement of the drums 28, 29, 30 and 31, and consequently the drive of the shaft 11. In a preferred construction, the eccentrics 42, 43, 44 and 45 are connected to rotate in unison by the shafts 46, 47, and 48, and the eccentric 45 is equipped with a spur gear 49. Any suitable mechanism may be used to rotate this gear, but I prefer to have it mesh with the gear 50, fixed on a shaft 51 which also has a fixed gear 52 meshing with the gear 53, which is driven by a gear 54 that receives power from a gear 55, fixed to the shaft 10. By giving all these gears the same number of teeth, the smaller eccentrics 42, 43, 44 and 45 will rotate in unison with the shaft 10 and therefore with the eccentrics 18, 19, 20 and 21. The shaft 51 is journaled and supported in a wormwheel 56 which is rotatably mounted on the shaft 10. The gear 53 is carried by a stub shaft 57 and links 58 and 59 connect the stub staft with the shaft 51 and the shaft 60 on which the gear 54 is journaled. The worm gear meshes with a worm 62 which is supported in a suitable way and controlled by a hand wheel 63. By turning the worm in one direction the worm wheel 56 will be rotated counter clockwise in Fig. 2 and the gears 52 and 53 will travel to the left from the solid line position towards the dotted line position. This movement will cause the gear 49 to be driven and rotate the eccentrics 42, 43, 44 and 45 and thereby change the effective throw of the eccentric devices on the shaft 10.

In operation, by rotating the shaft 10 the eccentrics 18, 19, 20 and 21 will be rotated, and if the eccentrics 42, 43, 44 and 45 are in a position other than that in which they neutralize the outer eccentrics, the connecting rods 26 will be reciprocated and through the clutch devices will drive the shaft 11 at a speed depending upon the speed of the shaft 10, the throw of the eccentrics, and the ratio between the throw of the eccentrics and the throw of the pins 27. It will be understood, of course, that the eccentrics are angularly spaced apart an amount such that as one rod 26 ceases its action the next rod 26 will come into action, thereby providing a continuous rotation of the driven shaft 11. By rotating the eccentrics 42, 43, 44 and 45, the ratio between the driving and the driven elements can be varied, as may be desired within the limits of the particular device. By varying the proportions the latitude may be varied to suit different conditions of different work, and by varying the number of eccentrics or the like driving devices, the character of the drive may be varied also. When the transmission is to be used for such work as driving the feed aprons of stokers, a smaller number of eccentrics and a shorter throw can be used than when faster or more uniform drive is desired. Those skilled in the art will readily select the number of driving devices and design them to suit the particular work to which the invention is to be put.

The use of eccentrics for driving devices makes it possible to very easily vary the throw to change the ratio of the drive and makes it possible to arrange the adjustment so that the driving elements may be rotated without communicating any power to the driven element. This is particularly useful in applying the device to hydro-carbon engines because it permits them to attain an efficient speed before any load is placed on them and then makes it possible to vary the ratio as may be most suitable under the conditions.

The friction clutches are particularly advantageous where a plurality of driving devices are to be used in overlapping relation because the drum having the fastest movement will operate its clutch and take up the load regardless of the engagement of any other clutch with its drum.

I claim:

1. The combination of a driving shaft, a plurality of inner eccentrics journaled on said shaft, an outer eccentric journaled on each inner eccentric and secured to the shaft to rotate therewith, means for operatively connecting all the inner eccentrics, and means for rotating the inner eccentrics.

2. The combination of a driving shaft, a crank arm thereon, an inner eccentric journaled on said shaft adjacent to said crank arm, an outer eccentric journaled on said inner eccentric, a pin and slot connection between said outer eccentric and said crank arm, and means for rotating the inner eccentric relative to the driving shaft.

3. The combination of a driving shaft having an inner eccentric journaled thereon, an outer eccentric journaled on the inner eccentric and connected with the shaft to rotate therewith, a plurality of gears having the same number of teeth interposed between the inner eccentric and the driving shaft, and means for changing the relation of said gears to adjust said inner eccentric.

4. The combination of a driving shaft, a plurality of eccentrics on said driving shaft and arranged in pairs, one eccentric in each pair embracing the other, the eccentrics of each pair having the same throw, the pairs being spaced apart angularly on the shaft, the outer eccentric of each pair being fixed to said driving shaft to rotate therewith, said inner eccentrics being rotatably mounted on said shaft and connected together, and means for adjusting said inner eccentrics in unison.

5. The combination of a driving shaft, a plurality of crank arms fixed thereto, an inner eccentric journaled on said shaft adjacent to each crank arm, an outer eccentric journaled on each inner eccentric and connected with each crank arm, said inner eccentrics being fixedly connected together, gearing interposed between one of said inner eccentrics and said shaft to drive said inner eccentrics in unison with the shaft, and means for adjusting said gearing to rotate said inner eccentrics in unison to change the throw of said eccentrics.

JOHN FERRIS.